United States Patent [19]
Toussant et al.

[11] Patent Number: 6,092,726
[45] Date of Patent: *Jul. 25, 2000

[54] UNIVERSAL MONITOR FOR COLLECTING DATA ON CONSUMABLE PRODUCTS

[75] Inventors: John William Toussant, West Chester, Ohio; Robert John Steller, Ft. Thomas, Ky.; Sandi Lin Moore, Cincinnati, Ohio

[73] Assignee: The Procter & Gamble Company, Cincinnati, Ohio

[ * ] Notice: This patent is subject to a terminal disclaimer.

[21] Appl. No.: 09/134,257

[22] Filed: Aug. 14, 1998

Related U.S. Application Data

[60] Provisional application No. 60/056,230, Aug. 21, 1997.

[51] Int. Cl.$^7$ .................................................. G06K 15/00
[52] U.S. Cl. .......................... 235/383; 235/375; 235/385; 702/101
[58] Field of Search .................................. 235/383, 375, 235/376, 384, 385, 436, 470; 702/101

[56] References Cited

U.S. PATENT DOCUMENTS

| | | |
|---|---|---|
| 2,936,163 | 5/1960 | Foster . |
| 3,058,223 | 10/1962 | Schmidt et al. . |
| 3,167,865 | 2/1965 | Steinberg . |
| 3,863,724 | 2/1975 | Dalia . |
| 4,097,726 | 6/1978 | Satoh et al. . |
| 4,151,403 | 4/1979 | Woolston . |
| 4,335,439 | 6/1982 | St. Denis . |
| 4,456,193 | 6/1984 | Westover . |
| 4,475,163 | 10/1984 | Chandler et al. . |
| 4,535,949 | 8/1985 | Olsson . |
| 4,570,348 | 2/1986 | Amsler et al. . |
| 4,697,278 | 9/1987 | Fleischer . |
| 4,704,798 | 11/1987 | Hird . |
| 4,721,265 | 1/1988 | Hawkins . |
| 4,767,922 | 8/1988 | Stauffer . |
| 4,817,044 | 3/1989 | Ogren . |
| 4,835,698 | 5/1989 | Beery et al. . |
| 4,902,965 | 2/1990 | Bodrug et al. . |
| 4,929,818 | 5/1990 | Bradbury et al. ................. 235/381 |
| 4,961,533 | 10/1990 | Teller . |
| 4,994,722 | 2/1991 | Dolan et al. . |
| 5,001,648 | 3/1991 | Baker et al. . |
| 5,031,258 | 7/1991 | Shaw . |
| 5,050,093 | 9/1991 | Reddy et sl. . |
| 5,153,560 | 10/1992 | Ichikawa . |
| 5,155,474 | 10/1992 | Park et al. . |
| 5,250,941 | 10/1993 | McGregor et al. . |
| 5,257,462 | 11/1993 | Buttermann . |
| 5,280,274 | 1/1994 | Uemura et al. . |
| 5,426,282 | 6/1995 | Humble . |
| 5,691,919 | 11/1997 | Gemmell et al. . |
| 5,699,162 | 12/1997 | Pirani et al. ..................... 235/383 X |
| 5,731,824 | 3/1998 | Kneezel et al. . |
| 5,918,197 | 6/1999 | Toussant et al. ................. 702/101 |
| 5,986,219 | 11/1999 | Carroll et al. ................... 235/385 X |

FOREIGN PATENT DOCUMENTS

| | | |
|---|---|---|
| WO 96/03172 | 2/1996 | WIPO . |
| WO 96/27114 | 9/1996 | WIPO . |
| WO 99/33008 | 7/1999 | WIPO . |

*Primary Examiner*—Michael G Lee
*Attorney, Agent, or Firm*—Vladimir Vitenberg; Larry L. Huston; Donald E. Hasse

[57] ABSTRACT

A universal and self-contained monitor for collecting data on consumer consumption of products dispensable by portions. The monitor comprises a supporting member capable of supporting a dispensable product thereon, a weight sensor in operative communication with the supporting member, and a recorder. The tested dispensable product has a product weight. The weight sensor measures the product weight as the portions of the tested dispensable product are removed therefrom. The recorder is in communication with the weight sensor for receiving and recording the product weight. Optionally, the monitor further comprises a consumer input device for receiving data generated by a user regarding usage and acceptability of the tested dispensable product. The results of the product weight measurements and the data generated by a user may be uploaded to a computer to create a data file.

29 Claims, 2 Drawing Sheets

UNIVERSAL MONITOR FOR COLLECTING DATA ON CONSUMABLE PRODUCTS

This Application claims the benefit of the filing date of Provisional Application Ser. No. 60/056,230, filed on Aug. 21, 1997.

FIELD OF THE INVENTION

The present invention relates to monitoring dispensing and use of consumer-dispensable products, consumption of which typically includes one-at-a-time dispensing of individual units of the product. More specifically, the present invention is concerned with a universal apparatus for collecting data regarding consumer habits related to consumption of a wide variety of such dispensable products.

BACKGROUND OF THE INVENTION

Attempts to provide consumers with dispensable products having superior quality require thorough investigation of consumer habits pertaining to consumption of such products. Such consumer-dispensable products include, but are not limited to: various disposable woven and non-woven products (napkins, facial tissue, towels, diapers, wipes, cosmetic pads, etc.); various liquid and non-liquid food products such as beverages, coffee, shortening, butter, grains, sugar, and other granular-like products; various personal-hygiene products such as bath soap, shampoo, tooth paste, deodorant, sanitary napkins, tampons, etc.; various laundry and cleaning products such as dish-washing soap, detergent, fabric softeners, and the like, and various medication products. Typically, these dispensable products are supplied in stacks (paper products), boxes or bags (grains, sugar, dry detergents), jars or cans (coffee, grains), bottles including spray-bottles (liquid food products, liquid detergents, hair spray), and other packaging which allows convenient dispensing of a portion of the product, as desired.

Current methods of monitoring consumer habits of consumption of the consumable products which normally include one-at-a-time dispensing of the product's portion traditionally rely on research questionnaires and handwritten diary-type studies. The typical questions in such questionnaires pertain to the detailed information regarding consumption of the product and other data related to consumer dispensing patterns. Traditional written questionnaire-like methods of collecting such information are expensive, time-consuming, and burdensome for both a manufacturer of the product and a consumer. Moreover, the traditional written questionnaire-like methods of collecting the data pertaining to patterns of consumption and usage of dispensable products may result in unnatural habit changes during a test period. Furthermore, the use of the traditional diary-type studies has a significant potential for a human error regarding details of dispensing such as, for example, time of the dispensing, amount/dosage of the product being dispensed and so on. Therefore, the limits of accuracy and consistency of the data collected by the traditional means affect the reliability of the interpretation of the collected data.

What is needed is a novel and efficient way of obtaining, in a manner which is not burdensome for a consumer, accurate information regarding patterns of the consumer consumption of dispensable products. Accordingly, it is an object of the present invention to provide a monitor for collecting data regarding patterns of consumer consumption of dispensable products.

It is another object of the present invention to provide a process of collecting and recording accurate information regarding patterns of the consumer consumption of such dispensable products.

SUMMARY OF THE INVENTION

A universal monitor for collecting data on consumer consumption of dispensable products comprises a supporting member, a weight sensor, a recorder, and preferably a real-time clock. The supporting member is capable of supporting a dispensable product being tested. The dispensable product is normally dispensed by individual portions: a portion or portions at-a-time. The dispensable product has a product weight, and an individual portion being dispensed has a portion weight. When the product is supported by the supporting member, a user can remove the individual portion(s) from the product, thereby decreasing the product weight. An act of removing one or more portions of the product from the product by a user, whereby a new (changed) product weight is measured and recorded by the monitor, is defined herein specifically as a "weight-changing event," or generically as an "event."

The weight sensor is in operative communication with the supporting member such as to measure an absolute value of the product weight. The preferred weight sensor is a load cell. For a given tested product, the weight sensor has resolution of at least about 40% of the portion weight. Preferably, the weight sensor has resolution of at least about 20% of the portion weight, and more preferably, the weight sensor 30 has resolution of at least about 5% of the portion weight.

A weight threshold indicates the minimal change in the product weight, which minimal change causes the monitor to record the weight-changing event. The weight threshold is preferably set up to be about 50% of the portion weight. Preferably, the weight sensor has resolution which is at least about two times higher than the weight threshold. More preferably, the weight sensor has resolution which is at least about four times higher than the weight threshold.

The recorder is in communication with the weight sensor for receiving and recording information regarding changes in the product weight. The monitor is preferably capable of adjusting its current weight baseline such as to accommodate changes in the product weight which are not associated with removal of the portions from the product and which are less than the weight threshold. The term "current weight baseline" refers to a current absolute value of the product weight with which the next subsequent absolute value of the product weight will be compared after one or more individual portion(s) of the product has (have) been removed from the product. For analysis purposes, the product weight is detected and measured in digital "counts." One count corresponds to a fraction of the portion weight.

Optionally, the monitor of the present invention has a consumer input device which allows a user to enter specific information regarding usage and acceptability of the product being tested. The consumer input device may comprise a switch or series of switches, such as, for example, push buttons. Alternatively or additionally, the consumer input device may comprise a voice recorder. An act of entering information using the consumer input device by a user is defined herein specifically as an "input event," or generically as an "event." Every input event is detected and recorded by the monitor, regardless of occurrence or non-occurrence of the weight-changing event.

The real time clock provides the information regarding a date and a time of the event. Event records may be uploaded from the recorder through an interface to a computer, in order to create a data file. The information entered by a user using the consumer input device is transmitted into the computer to be included in the data file. The data file can be uploaded to a computer and transformed into a spreadsheet.

In its process aspect, the present invention comprises the steps of:

(a) providing a product having a product weight and being dispensable by individual portions, each portion having a portion weight;

(b) providing a monitor comprising a supporting member capable of supporting the product, a weight sensor in operative communication with the supporting member for measuring the product weight as the portions are removed from the product, and a recorder in communication with the weight sensor for receiving and recording the product weight;

(c) installing the product such that the product is supported by the supporting member of the monitor; and (d) dispensing the product by the portions thereby changing the product weight and causing the monitor to measure and record the product weight.

The universal monitor of the present invention can be utilized in testing a wide variety of products including, but not limited to, stacks of paper sheets, rolls of paper, liquid products, paste-like products, granular products, powder products, and other products normally sold in grocery and drug stores.

DETAILED DESCRIPTION OF THE INVENTION

Figure 1:
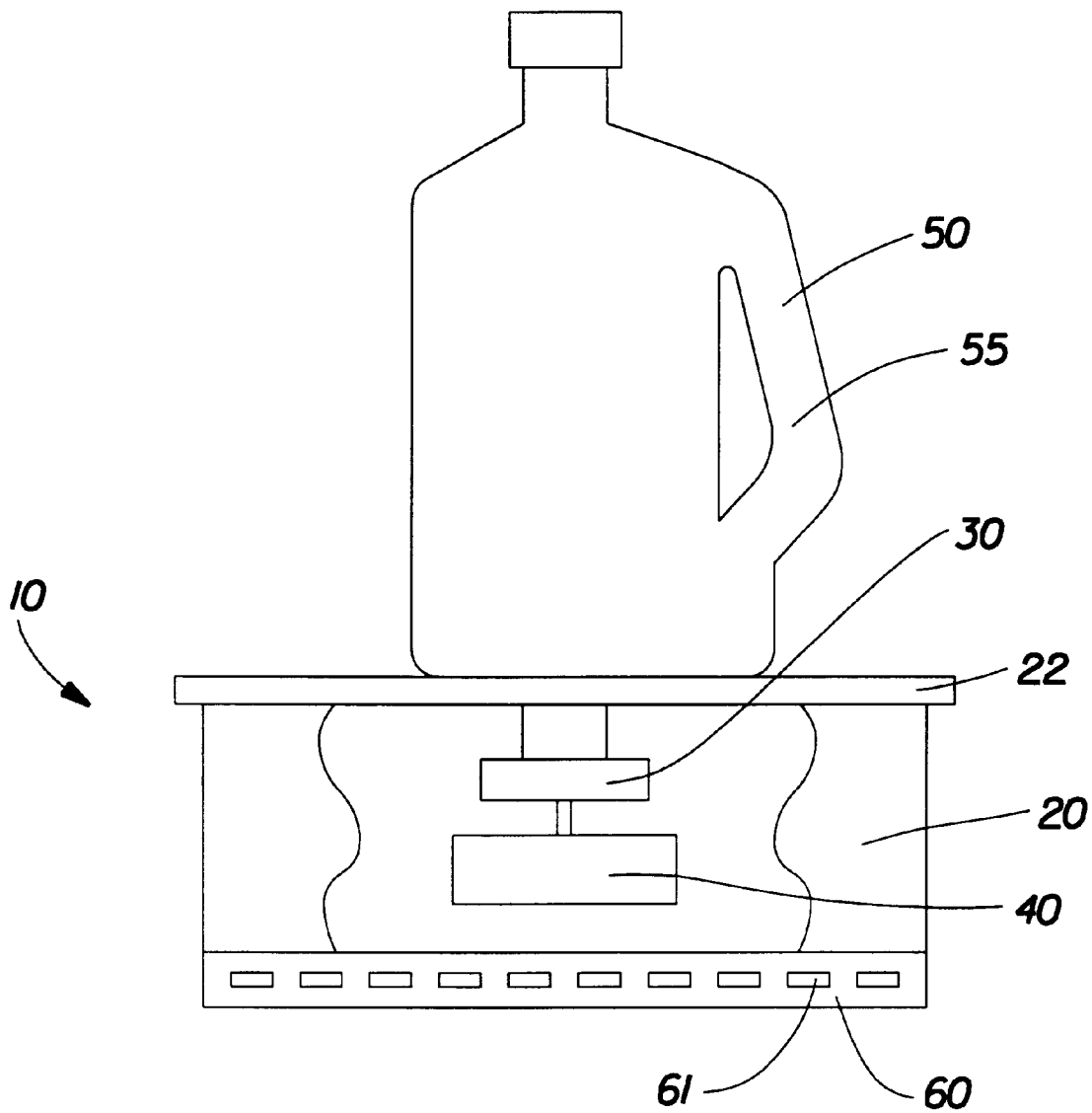
FIG. 1 is a schematic frontal view of one embodiment of the monitor of the present invention shown partially in cutaway.

As shown in FIG. 1, the monitor 10 of the present invention comprises three primary elements: a supporting member 22, a weight sensor 30, and a recorder 40. The monitor 10 schematically shown in FIG. 1 comprises a housing 20, which is preferred but not necessary. The housing 20 preferably comprises a case having a shape which allows placement of a disposable consumer product 50 such that the product 50 is supported by the supporting member 22. As an example, in the embodiment shown in FIG. 1, the housing 20 comprises a generally rectangular plastic case. It should be understood, however, that the housing 20 may have other shapes and comprise other materials. As it is one of the objectives of this invention to not interfere with normal usage habits of the consumer, the overall shape of the housing 20 and the supporting member 22 should be selected consistent with this objective. Preferably, at least a portion of the supporting member 22 is vertically movable relative to the housing 20. When the monitor 10 is in a working position, the vertical direction is preferably coincidental with the direction of the gravitation.

The supporting member 22 is capable of supporting, and preferably retaining, the product 50. While the product 50 is schematically shown in FIG. 1 as a bottle of detergent TIDE® produced and sold by the present assignee, the product 50 may comprise any suitable dispensable product consumption of which is normally characterized by multiple dosage per package (or "portion-at-a-time") dispensing. Such products include, but are not limited to, various disposable absorbent products (napkins, facial tissue, towel, wipes, diapers, toilet paper, sanitary napkins, tampons), liquid and non-liquid food products (soft drinks, coffee, grains, sugar, butter, shortening, oils), personal hygiene products (tooth pastes, deodorants, soaps, creams, lotions, medications), laundry products (detergent, fabric softener), and other consumer products dispensable by portions. The monitor 10 of the present invention is very versatile, for it is capable of testing patterns of consumption relating to all of such products, and regardless of the product's physical form: solid, semi-solid, fabricated article, or liquid. In this sense, the monitor 10 is a "universal" monitor.

The product 50 can preferably be (and typically is) disposed on the supporting member 22, as schematically shown in FIG. 1. Alternatively, the product 50 may be supported by the supporting member 22 without being directly disposed thereon. One skilled in the art will easily appreciate that a suitable product, such as, for example, a roll of toilet paper, or a roll of paper towel, may be suspended from the supporting member 22 for a "portion-at-a-time" dispensing. Such an arrangement will easily be appreciated by one skilled in the art and therefore is not illustrated herein.

It should be pointed out that the supporting member 22 does not need to comprise a planar, or flat, surface. The nature, characteristics and the task of the product 50 may require the use of the supporting member 22 having a specific non-planar configuration. Therefore, it should be understood that, as used herein, the term "supporting member 22" designates any element capable of supporting the product 50, whether or not the product 50 is physically disposed onto the supporting member 22. It would be apparent to one skilled in the art that the supporting member 22 can have a variety of shapes which are all included in the scope of the present invention. For example, a spindle-like element supporting a roll of toilet paper by its core is the "supporting member 22" in the meaning of the present invention. Another example of the supporting member 22 is the supporting member 22 having a concave shape, or a shape of a cup, and capable of retaining granular, tablet-like products without the use of a container.

As used herein, an individual portion, or a dosage, of the product 50, which portion may be removed from the product 50 at a time, is defined as a "portion". As used herein, a weight of the product 50 is defined as a "product weight," and a weight of the portion is defined as a "portion weight."

Typically, while not necessarily, the product 50 is contained in a container 55. If the product 50 is liquid, the container 55 typically comprises a bottle, a spray-bottle, a jar, or the like packaging. If the product 50 is not liquid, the container 55 may comprise a box-like packaging, such as, for example, a box of facial tissues PUFFS® produced and sold by the present assignee.

It is an important feature of the present invention that the monitor 10 allows one to conduct consumer consumption tests without altering original packaging of the tested products or otherwise interfering with normal and customary ways of their dispensing. In accordance with the present invention, a tested product in its original packaging can be used, and there is no need to re-package the tested product or perform other additional steps for the testing purposes. All that is needed in most cases is to place the tested product in the original packaging on the supporting member 22. The monitor 10 is a comparatively small apparatus which can easily fit in virtually any place where consumers customarily keep the types of the tested products described herein above.

The monitor 10 of the present invention, therefore, does not significantly alter, if at all, consumers' habits related to dispensing and usage of the tested products and thus provides reliable information in this regard. The monitor 10 of the present invention is also structured and designed to be able to test a wide variety of consumer products, from paper sheets to liquids and medications. The preferred product 50 is selected from the group consisting of a wide variety of products, such as: liquids, powders, pad-like products (such as diapers, tampons, and the like), bars (such as soap bars, deodorant sticks, lipsticks, semi-solid sticks of acne medication and the like), granular products (such as coffee, tablets, capsules, drops, and the like), paste-like, or jelly-like, products (such as creams, butters, lotions, and the like), and snacks (such as potato chips, candies, pretzels, and the like).

In a preferred embodiment the monitor 10 of the present invention is a relatively small, portable apparatus which fits virtually anywhere in a household, and is maintenance-free for expected periods of use. Also, the monitor 10 does not require the presence of a qualified personnel, for the monitor 10 is very simple in usage and requires no special maintenance during a pre-determined period of use.

When the product 50 is supported by the supporting member 22, a user can remove individual portions from the product 50, thereby changing (decreasing) the product weight by the amount of the dispensed portion or portions of the product 50. The weight sensor 30 is in operative communication with the supporting member 22 supporting the product 50. The weight sensor is also in communication with the recorder 40. Thus, when the product 50 changes its product weight—due to removal of the portion(s), or for other reasons—the monitor 10 (through the weight sensor 30 and the recorder 40) is capable of measuring and recording a new (changed) product weight. Of course, it should be understood that the change in the product weight must be at least equal to or preferably greater than the level of sensitivity of the weight sensor 30, for the weight sensor 30 to be able to detect the new (changed) product weight, as will be explained in greater detail below. As used herein, an act of removing the portion(s) from the product 50, whereby the monitor 10 measures and records the new (changed) product weight is defined as a "weight-changing event."

As one skilled in the art will readily appreciate, there is a variety of devices that can be used as the weight sensor 30 for the monitor 10 of the present invention. The examples of the weight sensor 30 include, but are not limited to, piezoelectric and piezoresistive (semiconductor) sensors, strain gauge sensors, capacitance sensors, inductive sensors, reluctance sensors, magnetostrictive sensors, and other weight-measuring devices well known in the art. The preferred weight sensor 30 of the present invention is an electronic load cell. The load cell is generally a device that converts a force applied to it into a proportional electrical signal. This electrical signal can be detected and measured by a recorder, and based on the measurement of the electrical signal the amount of the force applied to the load cell can be determined and recorded. Electronic load cells are described in H. A. Mills et al., *Process, Measurement and Analysis* (*Instrument Engineers' Handbook*), Chilton Book Company, 3d Edition, 1995, which book is incorporated by reference herein for the purpose of describing load cells. In the preferred embodiment of the present invention, the load cell converts the force created by the product weight into an electrical signal. Of course, the appropriate load cell 30 should be chosen depending on the nature of the product 50, and its product weight. For example, a "heavy-duty" monitor 10 suitable for testing consumption of a relatively heavy product 50, such as a bottle of a detergent shown in FIG. 1, should preferably utilize the load cell 30 of a type different from a type of the load cell 30 utilized in a "light-duty" monitor 10 suitable for testing consumption of a relatively light product 50, such as individually disposable light-weight paper sheets (not shown), or cough drops (not shown).

The weight sensor 30 measures an absolute value of the product weight. When a user removes one or more portion(s) from the product 50, the product weight changes by the weight of the removed portion or portions. The "new," or "changed," product weight, after the user removes one or more portion(s) from the product 50, corresponds to a current weight baseline. As used herein, the term "current weight baseline" refers to a current absolute value of the product weight with which the next subsequent absolute value of the product weight will be compared to establish a product weight decrement, after the user removes one or more individual portion(s) from the product 50, i.e., after the weight-changing event has occurred. This "new" subsequent product weight becomes a "new" current weight baseline, and so on, until the last portion is removed and the product 50 ceases to exist.

In selecting components for the monitor 10 of the present invention, it is important that the weight sensor 30 has resolution of at least about 40% of the portion weight. As used herein, the term "resolution" of the weight sensor 30 defines sensitivity of the weight sensor 30 and indicates a minimal change in the product weight, which minimal change causes the weight sensor 30 to detect and measure a new (changed) product weight after removal of the portion from the product 50, i.e., after the weight-changing event has occurred. One skilled in the art will readily understand that the smaller the numerical percentage of the resolution relative to the portion weight, the higher the resolution of the weight sensor 30. For example, the resolution of 5% of the portion weight is higher than the resolution of 10% of the portion weight.

Preferably, the weight sensor 30 of the monitor 10 of the present invention has resolution of at least about 20% of the portion weight. More preferably, the weight sensor 30 of the monitor 10 of the present invention has resolution of at least about 5% of the portion weight. For example, if a hypothetical portion has the portion weight 10 gram, then the preferred weight sensor 30 has resolution at least about 2 gram, and the more preferred weight sensor 30 has resolution at least about 0.5 gram.

As used herein, the term "weight threshold" indicates a minimal change in the product weight, which minimal change causes the monitor 10 to register the weight-changing event. Obviously, the resolution should be higher than the weight threshold. Preferably, the resolution is at least about two times higher than the weight threshold. More preferably, the resolution is at least about four times higher than the weight threshold. For example, if the desired weight threshold is at least about 0.4 gram, then the monitor 10 should preferably comprise the weight sensor 30 having the resolution of at least about 0.2 gram (twice as high as the weight threshold), and more preferably the weight sensor 30 having the resolution of at least about 0.1 gram (four times higher than the weight threshold). One skilled in the art will appreciate that based on the desired resolution of the monitor 10, the weight threshold can be set up to a certain value equal N times resolution, where "N" is an integer. The preferred weight threshold is about 50% of the portion weight. Of course, the portion weight is a variable characteristic which may depend on the nature of the product 50, its task and product weight, and other related factors. For a given product being tested, the weight threshold should be set up such as to take into account average product weight of the tested product 50 and the standard (statistical) weight deviations of the product weight and the portion weight, all of which may considerably differ from product to product. For example, a portion of a detergent typically used for laundry-washing purposes is, normally, heavier that a sheet of a facial tissue.

One skilled in the art will appreciate that during the time between two consecutive events, the current weight baseline may fluctuate due to changes in the environment, primarily temperature and humidity. This may especially be true for absorbent products that can gain and lose weight as the ambient humidity rises and falls. Such occurrences as vibration of the floor in a room where the monitor 10 is located, and the like occurrences, may also affect the current weight baseline. Therefore, the monitor 10 should preferably be capable of adjusting the current weight baseline such as to take into account any changes in the product weight which changes are less than the weight threshold. In other words, the monitor 10 should preferably be capable of adjusting the current baseline to compensate changes in the product weight, which changes are not associated with removal of the portions from the product 50. One skilled in the art will know how to cause the monitor 10 to automatically adjust the current weight baseline. At least one way of accomplishing such an adjustment of the current weight baseline is to have the recorder 40 to read the absolute value of the product weight at certain time intervals, for example, every 3 seconds. If the recorder 40 detects a change in the product weight which change is less than the weight threshold, the adjustment of the current weight baseline is preferably performed to adjust the current weight baseline to the new (changed) product weight without recording the change in the product weight. Of course, a minimal weight by which the current weight baseline can be adjusted is dictated by the level of sensitivity of the weight sensor 30, i.e., its resolution.

As has been pointed out herein above, consumer habits relating to dispensing of the dispensable products may significantly vary among consumers. These habits may also depend (and vary) based upon the nature of the tested product 50. For example, one group of consumers may prefer to remove the portion or portions from the product 50 without removing the entire product 50 from the supporting member 22 of the monitor 10. Another group of consumers may find it more convenient to first—remove the entire product 50 (including a container if applicable) from the supporting member 22, second—remove, or dispense, the portion(s) from the product 50, and third—install the product 50 back to be supported by the supporting member 22. The latter might be the case, for example, with the dispensable liquid product 50 schematically shown in FIG. 1. In the latter case, the absolute value of the product weight read by the recorder 40 should suddenly drop to a zero during a period of time when the product 50 is removed from the supporting member 22. This sudden drop to zero may be reflected in event records, as explained herein below, and may be taken into account while analyzing the event records. Alternatively, the monitor 10 may be capable of accommodating such sudden changes in the product weight read by the recorder 40, without these sudden changes being recorded in the event records.

Figure 2:
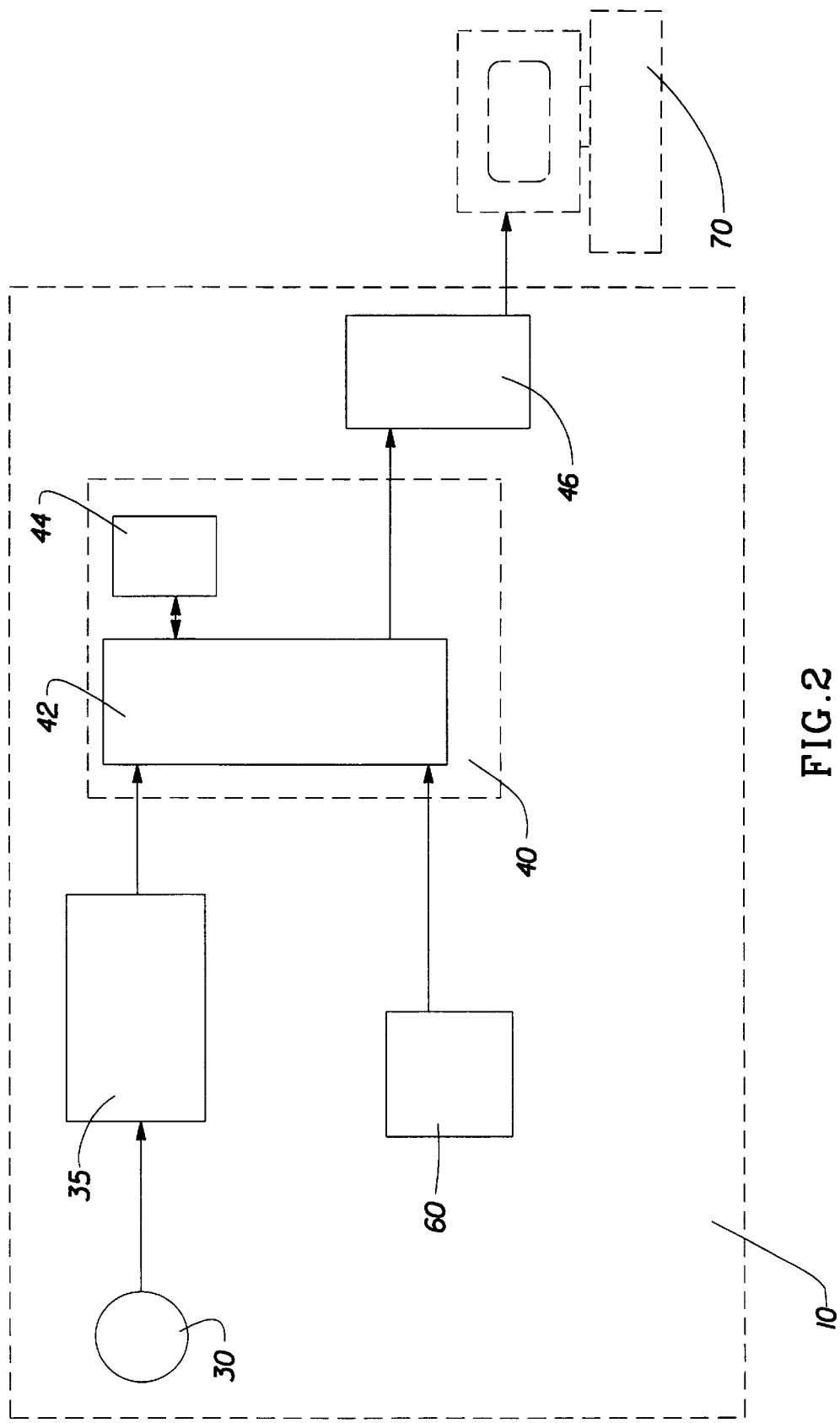
FIG. 2 is a block diagram of the embodiment of the monitor shown in FIG. 1.

In the embodiment of the monitor 10 of the present invention schematically shown in FIG. 2, the recorder 40 comprises a microprocessor 42 in communication with a memory 44 and a real time clock (not shown). The memory 44 is preferably nonvolatile memory so that in the case of power failure the data collected in the memory 44 would not be lost. The memory 44 having capacity of storing up to 2000 events has been found to perform satisfactory. In FIG. 2, the microprocessor 42 receives the information regarding changes in the product weight, i.e., "new," or changed, values of the product weight as the portions are removed from the product 50, from the weight sensor 30 through an analog to a digital converter 35.

For analysis purposes, the product weight is preferably measured in digital "counts." The analog to a digital converter 35 schematically shown in FIG. 2 is used to convert electrical signals produced by the weight sensor 30 comprising the load cell into the digital counts that can be read by the recorder 40. Preferably, at least one digital count corresponds to the resolution of the weight sensor 30. Of course, the weight sensor 30 should be chosen or adjusted such as to be capable of measuring the total product weight. For example, the load cell Model FT 50 Force Transducer commercially available from the manufacturer Revere Transducers, 14030 Bolsa Lane, Cerritos, Calif. 90701-5195, was set up to have 2048 counts over the 500 gram range to successfully test consumers' habits regarding consumption of the facial tissue PUFFS®, the average weight of the individual PUFFS® tissue portion (portion weight) being about 1.5 gram which corresponds to 6 counts.

Preferably, the monitor 10 of the present invention has a consumer input device 60, as shown in FIGS. 1 and 2. The consumer input device 60 is a user-activated device which allows a user to enter specific information regarding usage and acceptability of the product being tested. The consumer input device 60 may comprise a switch or series of switches, such as, for example, push-buttons 61 schematically shown in FIG. 1. Each push-button 61 corresponds to an answer to a certain question which a user can answer by pushing the push-button 61. Alternatively, the consumer input device 60 may comprise a voice recorder (not shown) allowing a user of the tested product 50 to verbally answer questions or make comments related to use and acceptability of the product. Other communicative devices known in the art and suitable for the purposes of the present invention may also be utilized in the monitor 10.

An act of a user entering information using the consumer input device 60 is defined herein as an "input event." Both the "weight changing event" and the "input event" are generically defined herein as an "event." The input event is detected and recorded by the monitor 10, whether or not any change in the product weight (i.e., weight-changing event) has occurred at or about the time of the input event.

The real time clock (not shown) provides the recorder 40 with the information regarding the date and the time of the event, whether it is the weight-changing event or the input event. While the real time clock is most preferable, in some embodiments of the monitor 10 of the present invention it is not necessary, for a sequence of the recorded events may be satisfactory for the testing purposes, depending, of course, on the goals of the testing and the nature of the product being tested. Preferably, each event has a separate event record, and more preferably, each event record includes the real time of the event. Each event record may be uploaded from the recorder 40 through an interface 46 to a computer 70, in order to create a data file. The interface 46 connects the monitor 10 of the present invention to the computer 70. The standard RS-232C serial link has proven to perform satisfactory as the interface 46. The data file can be transformed into a spreadsheet for ease of data handling and summarization, as one skilled in the art will easily understand. The data from many monitors 10 may be uploaded into the single computer 70 for data analysis and reporting. This same computer 70 is otherwise available for the full range of computer uses, when not directly involved in the data uploading and handling.

The following TABLE represents an exemplary spreadsheet developed in the course of testing the PUFFS® facial tissue, using the monitor 10 of the present invention. The following example is presented only for the purposes of illustrating the present invention, and not for the purposes of limitation.

(7) Event Analysis: dispense 3. "3" indicates that a user removed three portions from the product.

As has been pointed out above, one of the major advantages of the present invention is that the monitor 10 does not significantly alter consumers' habits related to dispensing and usage of the tested products. Therefore, the monitor 10 should preferably be a self-contained apparatus, independent of external source of electrical power. As used herein, the term "self-contained" refers to the quality of the monitor 10 of being completely independent from an external source of power for a predetermined period of time, i.e., for the period of the intended use. Applicants believe that that preferred feature of the monitor 10 of the present invention provides significant benefit and convenience over the prior art's test

TABLE

| (1) Data Records from monitor | (2) Date | (3) Time | (4) Absolute Count | (5) Delta Count | (6) Switch | (7) Event Analysis |
| --- | --- | --- | --- | --- | --- | --- |
| 96/07/15, 15:46:56, 077D, EE, 00 | 07/15/96 | 15:46:56 | 1917 | −18 | 0 | dispense 3 |
| 96/07/15, 15:47:17, 077D, 00, 03 | 07/15/96 | 15:47:17 | 1917 | 0 | 3 | switch 3 |
| 96/07/15, 15:47:26, 0777, FA, 00 | 07/15/96 | 15:47:26 | 1911 | −6 | 0 | dispense 1 |
| 96/07/15, 15:47:39, 0777, 00, 01 | 07/15/96 | 15:47:39 | 1911 | 0 | 1 | switch 1 |
| 96/07/15, 15:47:52, 076B, F4, 00 | 07/15/96 | 15:47:52 | 1899 | −12 | 0 | dispense 2 |
| 96/07/15, 15:48:24, 0765, FA, 00 | 07/15/96 | 15:48:24 | 1893 | −6 | 0 | dispense 1 |
| 96/07/15, 15:48:41, 075F, FA, 00 | 07/15/96 | 15:48:41 | 1887 | −6 | 0 | dispense 1 |
| 96/07/15, 15:49:02, 075F, 00, 02 | 07/15/96 | 15:49:02 | 1887 | 0 | 2 | switch 2 |

As the TABLE shows, each line in the column (1) represents the event record of the data collected from the monitor 10 for each event, whether it is the weight-changing event or the input event. Some of the data in the column (1) is recorded in hexadecimal symbols, such for example as: "077D," and "EE" (see the first line in the column (1) of the TABLE). Columns (2)–(6) represent the data from the first column broken down by categories and transcribed in decimal symbols. For example, the first event record in the TABLE contains the following data regarding the event:

(2) Date: 07/15/96. "Date" is the date of the event.

(3) Time: 15:46:56. "Time" is the time of the event.

(4) Absolute Count: 1917 (corresponding to hexadecimal 077D in the column (1)). "Absolute Count" is the number of digital "counts" representing the product weight, as explained above; it should not be confused with the actual number of the portions removed from the product 50 or their absolute weight.

(5) Delta Count: −18 (corresponding to hexadecimal EE in the column (1)). "Delta Count" is the change in the product weight represented in digital "counts"; the sign "−" (−) indicates weight decrement.

(6) Switch: 0 (corresponding to hexadecimal 00 in the column (1)). "Switch" represents occurrence or nonoccurrence of the consumer input device entry, i.e., type of the event recorded. Zero ("0") indicates that it was the weight-changing event. A numeric symbol other than "0" indicates that it was the input event. In the TABLE, the numeric symbols "3" in line 2 (second event record), "1" in line 5 (fifth event record), and "2" in the last line (last event record) represent specific push-buttons of the monitor 10 being used by a consumer. If both the weight-changing event and the input event are related to the same act of dispensing, separate event records are preferably recorded: one—reflecting the change of the product weight (weight-changing event record), and the other—reflecting the consumer's input information (input event record). These separate records then are grouped together based on the date and the time, for the analysis purposes.

apparatuses known to Applicants, and improve the reliability of the tests' results.

Preferably, the monitor 10 of the present invention comprises a source of electrical power which lasts long enough to supply the energy during an average life of the average product 50. More preferably, the monitor 10 comprises at least one electrical battery as a source of electrical power. The embodiment of the monitor 10 schematically shown in FIGS. 1 and 2 has successfully utilized six 1.5-Volt, D-cell, Alkaline "Long Life" electrical batteries (not shown). These six batteries in the monitor 10 lasted for the period of up to about two months, which period was found satisfactory for testing of the PUFFS®) facial tissue. In this sense, the preferred monitor 10 is a self-contained apparatus which can function regardless of the household electrical system. Of course, while not preferred, the monitor 10 of the present invention can be operated by a 110 Voltage system or other household power systems commonly available around the world.

As has been shown above, the preferred monitor 10 of the present invention is a universal, portable, and self-contained apparatus, the consumer use of which does not require an assistance of a skilled operator. The monitor 10 of the present invention can be used for virtually every dispensable consumer product, without altering consumer dispensing habits, thereby providing reliable data thereof. This versatility, or universality, of the monitor 10 of the present invention makes it an excellent tool for better understanding of the consumers' needs, and therefore—designing and producing even better consumer products.

What is claimed is:

1. A universal monitor for collecting data regarding consumer consumption of dispensable products, which monitor comprises;

a supporting member capable of supporting a dispensable product selected from the group consisting of liquids, powders, pads, bars, granular products, snacks, and pasty products, said dispensable product having a product weight and being dispensable by individual portions, each portion having a portion weight and being removable from said dispensable product;

a weight sensor in operative communication with said supporting member for measuring said product weight as said portions are removed therefrom;

a recorder in communication with said weight sensor for receiving and recording said product weight; and said monitor having a current weight baseline, said monitor being capable of adjusting said current weight baseline to compensate for changes in said product weight, which changes are not associated with removal of said portions from said dispensable product.

2. The monitor according to claim 1, further comprising a real-time clock for establishing a date and a time when said portions of said dispensable product are removed therefrom.

3. The monitor according to claim 1, wherein said recorder is capable of detecting changes in said product weight, which changes are not associated with dispensing of said portions of said dispensable product.

4. The monitor according to claim 3, wherein said recorder is capable of detecting changes in said product weight, which changes are caused by environmental conditions.

5. The monitor according to claim 1, wherein said weight sensor has resolution of at least about 40% of said portion weight.

6. The monitor according to claim 5, wherein said weight sensor has resolution of at least about 20% of said portion weight.

7. The monitor according to claim 6, wherein said weight sensor has resolution of at least about 5% of said portion weight.

8. The monitor according to claim 1, further comprising an analog to a digital converter in communication with said weight sensor and said recorder.

9. The monitor according to claim 1, wherein said weight sensor comprises a load cell.

10. The monitor according to claim 9, wherein said recorder comprises a microprocessor in communication with a memory.

11. The monitor according to claim 10, wherein said memory is a nonvolatile memory.

12. The monitor according to claim 1, further comprising a consumer input device for receiving data generated by a user.

13. The monitor according to claim 12, wherein said consumer input device comprises at least one switch controllable by the user.

14. The monitor according to claim 1, further comprising a source of electric power.

15. The monitor according to claim 14, wherein said source of electric power comprises at least one electric battery.

16. A universal self-contained monitor for collecting data on consumer consumption of dispensable products, which monitor comprises:

a supporting member capable of supporting a dispensable product, said dispensable product being dispensable by portions, said dispensable product having a product weight;

a weight sensor in operative communication with said supporting member for measuring an absolute value of said product weight as said portions of said dispensable product are removed therefrom;

a recorder in communication with said weight sensor for receiving and recording said absolute value of said product weight; and a current weight baseline, said monitor being capable of adjusting said current weight baseline to compensate for changes in said product weight, which changes are not associated with removal of said portions from said dispensable product.

17. The monitor according to claim 16, further comprising a consumer input device for receiving data generated by a user.

18. The monitor according to claim 17, further comprising a real-time clock for establishing a date and a time when said portions of said dispensable product are removed therefrom or said consumer input device is initiated.

19. A process for collecting data on consumer consumption of dispensable products, which process comprises:

(a) providing a dispensable product having a product weight and being dispensable by portions, each portion having a portion weight and being removable from said product, said product being selected from the group consisting of liquids, powders, pads, bars, granular products, snacks, and pasty products;

(b) providing a universal monitor comprising a supporting member capable of supporting said dispensable product, a weight sensor in operative communication with said supporting member for measuring said product weight as said portions of said dispensable product are removed therefrom, and a recorder in communication with said weight sensor for receiving and recording said product weight;

(c) installing said product such that said product is supported by said supporting member of said universal monitor; and (d) dispensing said product by portions thereby changing said product weight and causing said universal monitor to measure and record said product weight.

20. The process according to claim 19, wherein in the step (b) said monitor has a current weight baseline, said monitor being capable of adjusting said current baseline to compensate changes in said product weight, which changes are not associated with removal of said portions of said dispensable product therefrom.

21. The process according to claim 19 wherein said recorder is capable of detecting changes in said product weight, which changes are caused by environmental conditions.

22. The process according to claim 19, wherein in the step (b) said weight sensor has resolution of at least about 40% of said portion weight.

23. The process according to claim 19, wherein in the step (b) said monitor further comprises a source of electric power therein.

24. The process according to claim 19, wherein in the step (b) said monitor further comprises a consumer input device for receiving data generated by a user.

25. The process according to claim 19, wherein in the step (a) said dispensable product comprises a liquid product.

26. The process according to claim 19, wherein in the step (a) said dispensable product comprises a granular or powder product.

27. The process according to claim 19, wherein in the step (a) said dispensable product comprises a plurality of tablets or capsules.

28. The process according to claim 19, wherein in the step (a) said dispensable product comprises a pasty product.

29. The process according to claim 19, wherein in the step (a) said dispensable product comprises a pad.

\* \* \* \* \*

UNITED STATES PATENT AND TRADEMARK OFFICE
CERTIFICATE OF CORRECTION

PATENT NO. : 6,092,726  
DATED : July 25, 2000  
INVENTOR(S) : John William Toussant et al.

Page 1 of 1

It is certified that error appears in the above-identified patent and that said Letters Patent is hereby corrected as shown below:

Title page,
Under U.S PATENT DOCUMENTS, after "5,986,219  11/1999  Carroll et al.......235/385 x" insert thereof --

| | | |
|---|---|---|
| 4,650,464 | 3/1987 | Ruiz et al. |
| 4,674,060 | 6/1987 | Larkin et al. |
| 4,901,237 | 2/1990 | Hikita et al. |
| 4,922,922 | 5/1990 | Pollock et al. |
| 5,127,643 | 7/1992 | DeSanctis et al. |
| 5,211,252 | 5/1993 | Henderson et al. |
| 5,227,765 | 7/1993 | Ishizuka et al. |
| 5,267,703 | 12/1993 | Biagoitti |
| 5,563,809 | 10/1996 | Williams et al. |
| 5,629,498 | 5/1997 | Pollock et al. --. |

ABSTRACT,
Line 2, after "portions" insert thereof -- is disclosed. --.

Signed and Sealed this

Twenty-fifth Day of December, 2001

Attest:

Attesting Officer

JAMES E. ROGAN  
*Director of the United States Patent and Trademark Office*